United States Patent
Tang et al.

(10) Patent No.: US 7,437,451 B2
(45) Date of Patent: Oct. 14, 2008

(54) SYSTEM AND METHOD FOR COLLECTING DESIRED INFORMATION FOR NETWORK TRANSACTIONS AT THE KERNEL LEVEL

(75) Inventors: Wenting Tang, Sunnyvale, CA (US); Ludmila Cherkasova, Sunnyvale, CA (US); Yun Fu, Durham, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1217 days.

(21) Appl. No.: 10/147,249

(22) Filed: May 16, 2002

(65) Prior Publication Data
US 2003/0217130 A1 Nov. 20, 2003

(51) Int. Cl.
*G06F 15/173* (2006.01)
(52) U.S. Cl. .................................................... 709/224
(58) Field of Classification Search ................ 709/250, 709/218, 228, 230, 237, 225, 224; 726/6, 726/24; 713/151, 200
See application file for complete search history.

(56) References Cited

U.S. PATENT DOCUMENTS

| | | | |
|---|---|---|---|
| 6,389,462 B1* | 5/2002 | Cohen et al. ................. | 709/218 |
| 6,636,972 B1* | 10/2003 | Ptacek et al. .................... | 726/6 |
| 6,675,218 B1* | 1/2004 | Mahler et al. ................ | 709/230 |
| 6,728,885 B1* | 4/2004 | Taylor et al. ................... | 726/24 |
| 6,934,761 B1* | 8/2005 | Curtis ........................ | 709/237 |
| 2002/0032854 A1* | 3/2002 | Chen et al. ................... | 713/151 |
| 2002/0046284 A1* | 4/2002 | Brabson et al. ............. | 709/228 |
| 2003/0005122 A1* | 1/2003 | Freimuth et al. ............. | 709/225 |
| 2003/0028674 A1* | 2/2003 | Boden ......................... | 709/250 |
| 2003/0110394 A1* | 6/2003 | Sharp et al. .................. | 713/200 |

OTHER PUBLICATIONS

Harris, "Info on WinPCAP/WinDUMP", www.tcpdump.org, Apr. 2, 2001.*
"Capturing TCP Packets", www.OnLamp.com, Mar. 21, 2001.*
"Candle Corporation eBusiness"; printed from Website http://www.candle.com—10 pages, no date available.
"Cisco DistributedDirector"; printed from Website http//www.cisco.com—20 pages, 1999.
Feldmann, Anja, "BLT: Bi-Layer Tracing of HTTP and TCP/IP", AT&T Labs—Research, Florham Park, NJ,—12 pages, 2000.
"IBM Corporation, Tivoli Web Management Solutions"; printed from Website http://www.tivoli.com—5 pages, no date available.
"JavaServlet Technology"; printed from Website http://java.sun.com—14 pages, 2000.

(Continued)

*Primary Examiner*—Jungwon Chang (57) ABSTRACT

According to one embodiment of the present invention, a method for compiling desired information for network transactions is provided. The method comprises capturing network-level information in a kernel-level module of a processor-based device arranged on the server-side of a client-server communication network, and using the captured network-level information to compile, in the kernel-level module, desired information for at least one network transaction conducted between a client and a server via the client-server communication network. Another embodiment of the present invention provides a method for compiling desired information for network transactions that comprises implementing a kernel-level module in a STREAMS-based network stack of a server, wherein the kernel-level module is operable to monitor a network connection to the server to compile desired information for network transactions conducted through the network connection.

50 Claims, 5 Drawing Sheets

OTHER PUBLICATIONS

"Javaserver Pages White Paper"; printed from Website http://java.sun.com—8 pages, 2000.

"Keynote Systems, Inc."; printed from Website http://www.keynote.com—4 pages, 2002.

Krishnamurthy, Balachander, et al.; "Web Protocols and Practice: HTTP/1.1, Networking Protocols, Caching, and Traffic Measurement"; pp. 511-522, Addison Wesley, 2001.

NetMechanic, Inc.; printed from Website http://www.netemechanics.com—2 pages, 2002.

Porivo Technologies, Inc.; printed from Website http://www.porivo.com—5 pages, 2002.

Rajamony, Ramakrishnan et al., Measuring Client-Perceived Response Times on the WWW; proceedings of the Third USENIX Symposium on Internet Technologies and Systems, Mar. 2001—12 pages.

Seshan, Srinivasan, et al., "SPAND: Shared Passive Network Performance Discovery", USENIX Symposium on Internet Technologies and Systems, 1997, 6 pages.

Stemm, Mark, et al., "A Network Measurement Architecture for Adaptice Applications", USENIX Symposium on Internet Technologies and Systems, 1997-10 pages.

Smith, F. Donelson, et al., "What TCP/IP Protocol Headers Can Tell Us About the Web", Proceedings of ACM Sigmetrics 2001/Performance 2001, Jun. 2001—12 pages.

RFC2616; printed from Internet RFC/STD/FYI/BCO Archives, 1999.

* cited by examiner

SYSTEM AND METHOD FOR COLLECTING DESIRED INFORMATION FOR NETWORK TRANSACTIONS AT THE KERNEL LEVEL

CROSS-REFERENCE TO RELATED APPLICATIONS

This application is related to concurrently filed and commonly assigned U.S. Published Patent Application No. 2003/0221000 entitled "SYSTEM AND METHOD FOR MEASURING WEB SERVICE PERFORMANCE USING CAPTURED NETWORK PACKETS", concurrently filed and commonly assigned U.S. Published Patent Application No. 2003/0217162 entitled "SYSTEM AND METHOD FOR RECONSTRUCTING CLIENT WEB PAGE ACCESSES FROM CAPTURED NETWORK PACKETS", concurrently filed and commonly assigned U.S. Published Patent Application No. 2003/0217144 entitled "KNOWLEDGE-BASED SYSTEM AND METHOD FOR RECONSTRUCTING CLIENT WEB PAGE ACCESSES FROM CAPTURED NETWORK PACKETS", and concurrently filed and commonly assigned U.S. Published Patent Application No. 2005/0076111 entitled "SYSTEM AND METHOD FOR RELATING ABORTED CLIENT ACCESSES OF DATA TO QUALITY OF SERVICE PROVIDED BY A SERVER IN A CLIENT-SERVER NETWORK", the disclosures of which are hereby incorporated herein by reference.

FIELD OF THE INVENTION

The present invention relates in general to collecting network information in client-server networks, and more specifically to a system and method for collecting network information for network transactions using a kernel-level module.

BACKGROUND OF THE INVENTION

A desire often exists for collecting network information for transactions in a client-server network. For example, it may be desirable to collect network information for transactions to enable measurement of the performance of such transactions. As described in greater detail hereafter, clients and servers generally interact through transactions. That is, a client typically communicates a request to the server for desired information and the server communicates a response (e.g., which may include the requested information) to the client. Such client request and corresponding server response comprises a "transaction." Thus, it may be desirable to collect information about such transactions to, for example, enable measurement of the performance of such transactions.

One popular client-server network is the Internet. The Internet is a packet-switched network, which means that when information is sent across the Internet from one computer to another, the data is broken into small packets. A series of switches called routers send each packet across the network individually. After all of the packets arrive at the receiving computer, they are recombined into their original, unified form. TCP/IP is a protocol commonly used for communicating the packets of data. In TCP/IP, two protocols do the work of breaking the data into packets, routing the packets across the Internet, and then recombining them on the other end: 1) the Internet Protocol (IP), which routes the data, and 2) the Transmission Control Protocol (TCP), which breaks the data into packets and recombines them on the computer that receives the information. TCP/IP is well known in the existing art, and therefore is not described in further detail herein.

One popular part of the Internet is the World Wide Web (which may be referred to herein simply as the "web"). Computers (or "servers") that provide information on the web are typically called "websites." Services offered by service providers' websites are obtained by clients via the web by downloading web pages from such websites to a browser executing on the client. For example, a user may use a computer (e.g., personal computer, laptop computer, workstation, personal digital assistant, cellular telephone, or other processor-based device capable of accessing the Internet) to access the Internet (e.g., via a conventional modem, cable modem, Digital Subscriber Line (DSL) connection, or the like). A browser, such as NETSCAPE NAVIGATOR developed by NETSCAPE, INC. or MICROSOFT INTERNET EXPLORER developed by MICROSOFT CORPORATION, as examples, may be executing on the user's computer to enable a user to input information requesting to access a particular website and to output information (e.g., web pages) received from an accessed website.

In general, a web page is typically composed of a mark-up language file, such as a HyperText Mark-up Language (HTML), Extensible Mark-up Language (XML), Handheld Device Mark-up Language (HDML), or Wireless Mark-up Language (WML) file, and several embedded objects, such as images. A browser retrieves a web page by issuing a series of HyperText Transfer Protocol (HTTP) requests for all objects. As is well known, HTTP is the underlying protocol used by the World Wide Web. The HTTP requests can be sent through one persistent TCP connection or multiple concurrent connections.

As mentioned above, a desire often exists for collecting network information for transactions in a client-server network. For example, it may be desirable to collect information for transactions for measuring the performance of such transactions. Web server access logs are widely used in the existing art to collect information for analyzing site performance. However, web server logs do not provide enough information to derive advanced performance metrics, such as the end-to-end response time observed by clients. In general, web server access logs are collected by web server software executing in the user-space.

Additionally, network-level collection tools are available in the existing art for collecting network information. Such network collection tools include the publicly available UNIX tool known as "tcpdump" and the publicly available WINDOWS tool known as "WinDump." The software tools "tcpdump" and "WinDump" are well-known and are commonly used in the networking arts for capturing network-level information for network "sniffer/analyzer" applications. Typically, such tools are used to capture network-level information for monitoring security on a computer network (e.g., to detect unauthorized intruders, or "hackers", in a system).

The collection tools of the existing art, such as tcpdump, capture raw network information that is not organized into transactions. That is, the raw network information may include interleaved information for various different transactions. Techniques have been proposed for reconstructing the raw network information captured by a collection tool, such as tcpdump, into their corresponding transactions. For instance, a methodology for rebuilding HTTP transactions from TCP-level traces was proposed by Anja Feldmann in "BLT: Bi-Layer Tracing of HTTP and TCP/IP", Proceedings of WWW-9, May 2000, the disclosure of which is hereby incorporated herein by reference. Balachander Krishnamurthy and Jennifer Rexford explain this mechanism in more detail and extend this solution to rebuild HTTP transactions for persistent connections in "Web Protocols and Practice:

HTTP/1.1, Networking Protocols, Caching, and Traffic Measurement" pp. 511-522, Addison Wesley, 2001, the disclosure of which is also hereby incorporated herein by reference.

Accordingly, raw network information may be collected using a network-level collection tool, such as tcpdump, and such raw network information is stored in the user-space (e.g., stored to disk). Thereafter, the raw network information may be analyzed by a program executing in the user-space to organize the raw network information into corresponding network transactions (request-response pairs) using, for example, the methodology proposed by Anja Feldmann.

BRIEF SUMMARY OF THE INVENTION

According to one embodiment of the present invention, a method for compiling desired information for network transactions is provided. The method comprises capturing network-level information in a kernel-level module of a processor-based device arranged on the server-side of a client-server communication network, and using the captured network-level information to compile, in the kernel-level module, desired information for at least one network transaction conducted between a client and a server via the client-server communication network. Another embodiment of the present invention provides a method for compiling desired information for network transactions that comprises implementing a kernel-level module in a STREAMS-based network stack of a server, wherein the kernel-level module is operable to monitor a network connection to the server to compile desired information for network transactions conducted through the network connection.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Various embodiments of the present invention are now described with reference to the above figures, wherein like reference numerals represent like parts throughout the several views. In accordance with various embodiments of the present invention, a kernel-level module is provided that is operable to compile desired information for network transactions. For example, in one embodiment, a kernel-level module is implemented on a web server to analyze network packets and compile a web transaction log that includes desired information regarding transactions with the web server. The compiled web transaction log may, for example, include information regarding the performance of transactions with the web server. The compiled web transaction log may further include information from which various transactions for a given web page access may be related together, thus enabling the performance of a web page access to be analyzed. The compiled information for network transactions may be communicated from the kernel-level module to the user space for storage (e.g., to disk) and/or for further processing. As described further below, embodiments of the present invention provide several advantages over prior art techniques for compiling information for network transactions, including providing greater storage and computational efficiency, as examples.

As described above, a desire often exists for collecting information for network transactions in a client-server network. As described in greater detail hereafter, clients and servers generally interact through transactions. For instance, a client typically communicates a request to the server for desired information and the server communicates a response (e.g., which may include the requested information) to the client. Such client request and corresponding server response comprises a transaction. An example of conducting network transactions is described hereafter in conjunction with a client access of a web page (in FIG. 1). As described above, a web page is generally composed of a mark-up language file, such as an HTML, XML, HDML, or WML file, and several embedded objects, such as images. A browser executing at a client computer retrieves a web page by issuing a series of HTTP requests for all objects of the desired web page. The HTTP requests can be sent through one persistent TCP connection or multiple concurrent connections.

Figure 1:
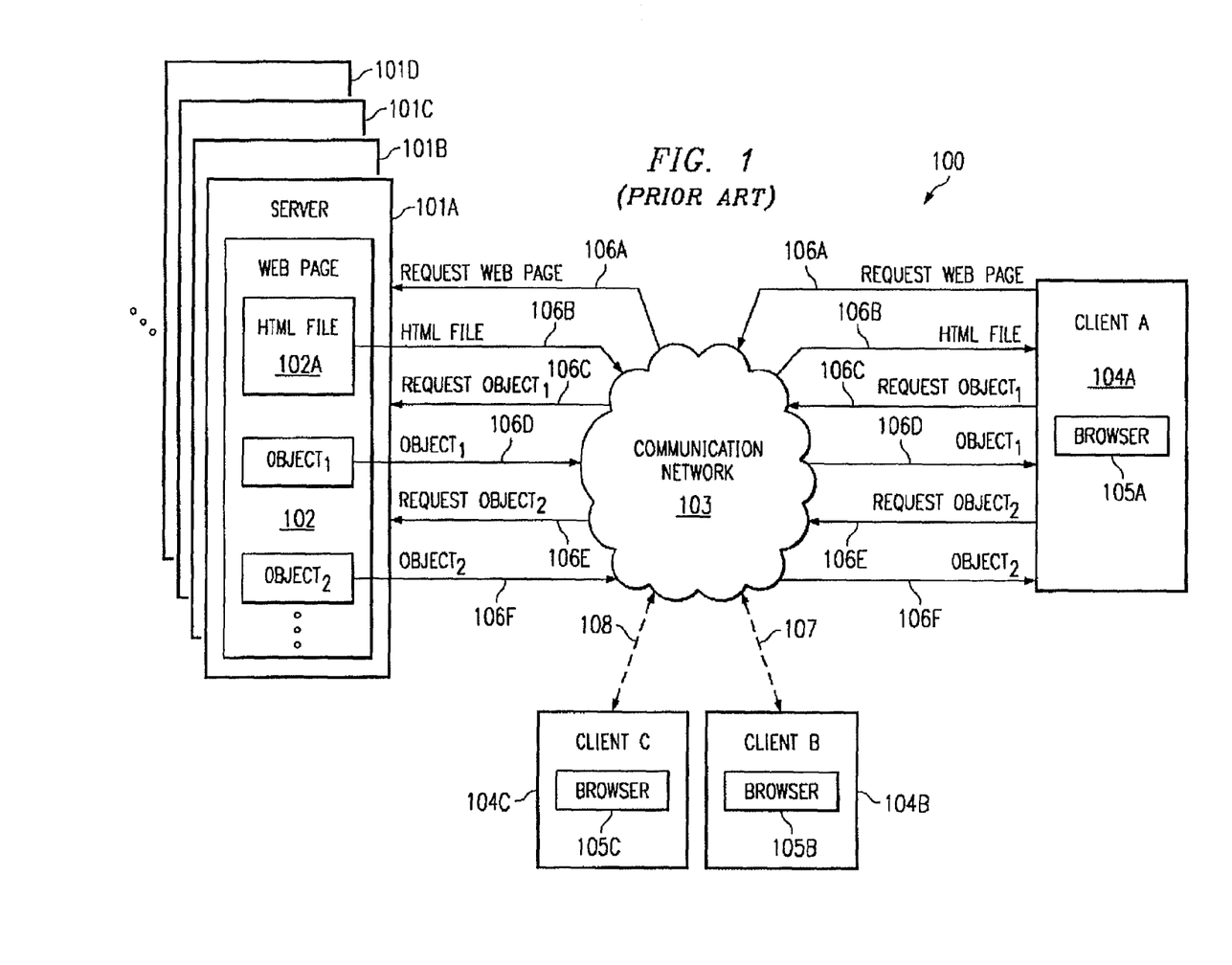
FIG. 1 shows an example client-server system in which embodiments of the present invention may be implemented.

Turning to FIG. 1, an example client-server system 100 is shown in which embodiments of the present invention may be implemented. As shown, one or more servers 101A-101D may provide services to one or more clients, such as clients A-C (labeled 104A-104C, respectively), via communication network 103. Communication network 103 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computers to communicate with each other.

In a preferred embodiment, servers 101A-101D comprise web servers that are utilized to serve up web pages to clients A-C via communication network 103 in a manner as is well known in the art. Accordingly, system 100 of FIG. 1 illustrates an example of servers 101A-101D serving up web pages, such as web page 102, to requesting clients A-C. Of course, embodiments of the present invention are not limited in application to compiling information about network transactions for web page accesses within a web environment, but may instead be implemented for compiling information about network transactions conducted for many other types of client accesses of a server. For example, clients may access server(s) in various other types of client-server environments in order to receive information from such server(s). Further, the client and server may interact through transactions (i.e., requests and corresponding responses) via a packet-switched network. Embodiments of the present invention may be implemented to capture network packets during the transactions between the client and server and compile desired information regarding the transactions, such as performance information (e.g., timestamps) about the transactions.

In the example of FIG. 1, web page 102 comprises an HTML (or other mark-up language) file 102A (which may be referred to herein as a "main page"), and several embedded objects (e.g., images, etc.), such as $Object_1$ and $Object_2$. Techniques for serving up such web page 102 to requesting clients A-C are well known in the art, and therefore such techniques are only briefly described herein. In general, a browser, such as browsers 105A-105C, may be executing at a client computer, such as clients A-C. To retrieve a desired web page 102, the browser issues a series of HTTP requests for all objects of the desired web page. For instance, various client requests and server responses are communicated between client A and server 101A in serving web page 102 to client A, such as requests/responses 106A-106F (referred to collectively herein as requests/responses 106). Requests/responses 106 provide a simplified example of the type of interaction typically involved in serving a desired web page 102 from server 101A to client A. As mentioned above, a request and the corresponding response to such request forms a "transaction." As those of skill in the art will appreciate, requests/responses 106 do not illustrate all interaction that is involved through TCP/IP communication for serving a web page to a client, but rather provides an illustrative example of the general interaction between client A and server 101A in providing web page 102 to client A.

When a client clicks a hypertext link (or otherwise requests a Uniform Resource Locator (URL)) to retrieve a particular web page, the browser first establishes a TCP connection with the web server by sending a SYN packet (not shown in FIG. 1). If the server is ready to process the request, it accepts the connection by sending back a second SYN packet (not shown in FIG. 1) acknowledging the client's SYN. At this point, the client is ready to send HTTP requests 106 to retrieve the HTML file 102A and all embedded objects (e.g., $Object_1$ and $Object_2$), as described below.

First, client A makes an HTTP request 106A to server 101A for web page 102 (e.g., via client A's browser 105A). Such request may, as examples, be in response to a user inputting the URL for web page 102 or in response to a user clicking on a hyperlink to web page 102. Server 101A receives the HTTP request 106A and sends HTML file 102A (e.g., file "index.html") of web page 102 to client A via response 106B. HTML file 102A typically identifies the various objects embedded in web page 102, such as $Object_1$ and $Object_2$. Accordingly, upon receiving HTML file 102A, browser 105A requests the identified objects, $Object_1$ and $Object_2$, via requests 106C and 106E. Upon server 101A receiving the requests for such objects, it communicates each object individually to client A via responses 106D and 106F, respectively.

Again, the above interactions are simplified to illustrate the general nature of requesting a web page, from which it should be recognized that each object of a web page is requested individually by the requesting client and is, in turn, communicated individually from the server to the requesting client. The above requests/responses 106 may each comprise multiple packets of data. Further, the HTTP requests can, in certain implementations, be sent from a client through one persistent TCP connection with server 101A, or, in other implementations, the requests may be sent through multiple concurrent connections. Server 101A may also be accessed by other clients, such as clients B and C of FIG. 1, and various web page objects may be communicated in a similar manner to those clients through packet communication 107 and 108, respectively.

Figure 2:
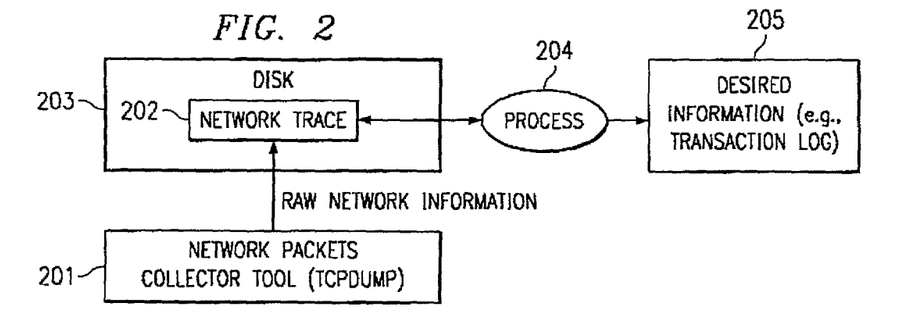
FIG. 2 shows an example of a prior art technique for capturing network information and compiling such network information into corresponding network transactions.

As described above, techniques exist in the prior art for capturing network information and compiling such network information into corresponding network transactions. An example of such a technique is shown in FIG. 2. As shown, network packets collector tool 201, such as the publicly available UNIX tool known as "tcpdump" or the publicly available WINDOWS tool known as "WinDump", may be utilized to capture raw network information. The captured raw network information may comprise interleaved information for various different transactions. The captured raw network information may be stored as a "Network Trace" file 202 to a storage media, typically hard disk 203. Thereafter, a process 204 may execute to retrieve the raw network information from network trace 202 and organize the information into corresponding transactions. Additionally, process 204 may filter much of the captured raw network information to result in desired information 205 for network transactions. As mentioned above, one technique for rebuilding HTTP transactions from TCP-level traces (captured raw network information) was proposed by Anja Feldmann in "BLT: Bi-Layer Tracing of HTTP and TCP/IP", Proceedings of WWW-9, May 2000. Balachander Krishnamurthy and Jennifer Rexford explain this mechanism in more detail and extend this solution to rebuild HTTP transactions for persistent connections in "Web Protocols and Practice: HTTP/1.1, Networking Protocols, Caching, and Traffic Measurement" pp. 511-522, Addison Wesley, 2001. Accordingly, process 204 may utilize these proposed techniques to generate desired information 205 from network trace 202.

As described in concurrently filed and commonly assigned U.S. Published Patent Application No. 2003/0217162 entitled "SYSTEM AND METHOD FOR RECONSTRUCTING CLIENT WEB PAGE ACCESSES FROM CAPTURED NETWORK PACKETS" and in concurrently filed and commonly assigned U.S. Published Patent Application No. 2003/0217144 entitled "KNOWLEDGE-BASED SYSTEM AND METHOD FOR RECONSTRUCTING CLIENT WEB PAGE ACCESSES FROM CAPTURED NETWORK PACKETS," a network packets collector tool 201 may be utilized to capture network information during client web page accesses of a web server, thus forming Network Trace 202. A process 204 (e.g., a request-response reconstructor) may execute to construct, from Network Trace 202, a web transaction log 205 that comprises a desired portion of the captured information organized by corresponding transactions to which the information relates. The desired portion of the captured information that is maintained in the web transaction log 205 may comprise information that is useful in reconstructing client web page accesses (i.e., grouping transactions with their corresponding web page access) and/or information for measuring the performance of the transaction (or reconstructed web page access).

For instance, network packets collector tool 201 may be utilized to capture a large number of network packets (e.g., 1 million packets) over the course of a particular time period (e.g., a day). The captured packets, which comprise interleaved packets for various different transactions, may be stored to Network Trace 202 on hard disk 203. For example, the captured packets may include packets for various different transactions (requests/responses) associated with different clients accessing a web page. Thereafter, process 204 executes to organize the captured information from Network Trace 202 into corresponding transactions to which such information relates. Further, the captured information in Network Trace 202 may comprise much more information than is actually desired for each transaction. Thus, process 204 may filter out much of the information for each transaction resulting in desired information 205, which may require much less storage space than Network Trace 202. For instance, Network Trace 202 may comprise 1 gigabyte of data for the 1 million packets captured, and the desired information 205 compiled by process 204 from Network Trace 202 may be much smaller (e.g., 100 times smaller) that Network Trace 202. Thus, the desired information 205 for the network transactions may be orders of magnitude smaller than the size of the raw network information of Network Trace 202.

The above technique for acquiring desired information for network transactions is undesirable for several reasons. First, a large amount of raw network information has to be transferred from the kernel to the user-level before it is processed. Second, this technique does not make efficient use of storage space. For instance, the raw network information may include much more information than is actually desired, which must be stored (e.g., to hard disk 203). For example, as described above, Network Trace 202 may comprise 1 gigabyte of raw network information captured for 1 million packets during client accesses of a web page, which may be greatly reduced by process 204 in filtering out the information (e.g., web transaction log) that is actually desired. Thus, Network Trace 202 undesirably consumes a large amount of storage space for storing unnecessary/undesired network information. Additionally, the above technique for acquiring information for network transactions is somewhat computationally inefficient because process 204, executing in the user-space, is required to analyze the information captured in Network Trace 202 and organize such information into corresponding transactions to which the information relates. That is, the raw network information captured by network packets collector tool 201 (e.g., tcpdump) is not organized by corresponding transactions, but rather comprises interleaved network information for many different transactions.

Figure 3:
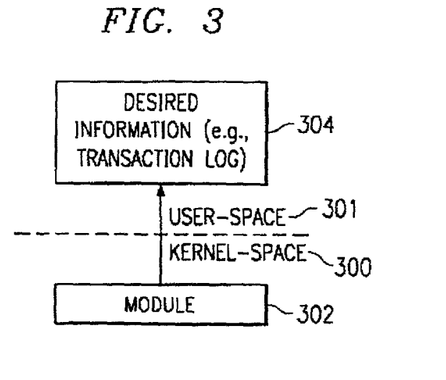
FIG. 3 shows an example of an embodiment of the present invention for capturing information for network transactions.

As described in greater detail below, embodiments of the present invention utilize a module executing at the kernel level to collect the desired information for network transactions. Turning to FIG. 3, an example of an embodiment of the present invention is shown. As shown, module 302 is arranged in kernel-space 300 and is executable to capture network information during client-server transactions. More specifically, module 302 may be executable to capture network information and organize the captured network information into corresponding transactions. That is, module 302 may be operable to capture network information and relate the information to its corresponding transaction. Further, module 302 may be operable to compile only the desired information for each network transaction. Thus, kernel-level module 302 captures the desired information 304 for network transactions, such as a web transaction log, and may then communicate the desired information 304 for network transactions to user-space 301, whereat the desired information may be further processed. For example, a program may execute in user-space 301 to organize the captured transactions into their corresponding web page accesses and/or a program may execute in user-space 301 to measure the performance of the captured transactions.

Accordingly, embodiments of the present invention enable desired information to be acquired for network transactions without unnecessarily consuming storage space at the user-level 301 with unneeded/undesired information. That is, rather than storing a large amount of raw network information that includes unneeded/undesired information to the user space (such as Network Trace 202), as in the technique of FIG. 2, kernel-level module 302 executes to compile the desired information to be communicated to user-space 301, thus avoiding the need to store network information that is not needed/desired to user-space 301. Further, kernel-level module 302 may avoid the transfer of an unnecessarily large amount of data from the kernel-level to the user-level. Additionally, kernel-level module 302 preferably groups the desired information into corresponding transactions to which the information relates. Therefore, processing at user-space level 301 to perform such grouping of the desired information into corresponding transactions is not necessary.

Figure 4:
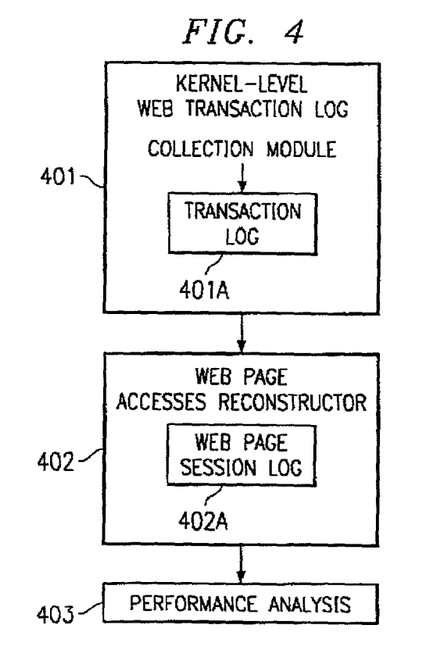
FIG. 4 shows an example implementation that includes a kernel-level module to collect desired information for network transactions in accordance with a preferred embodiment of the present invention.

Turning now to FIG. 4, an example implementation that includes a kernel-level module to collect desired information in accordance with a preferred embodiment of the present invention is shown. According to this example implementation, kernel-level module 401 is operable to collect information for a web Transaction Log 401A. More specifically, in a preferred embodiment, kernel-level module 401 may execute on the server side of a client server network to collect desired information for client accesses of server information (e.g., web page). As used herein, the "server side" of a client-server network is not intended to be limited solely to the server itself, but is also intended to comprise any point in the client-server network at which all of the traffic "to" and "from" the server (e.g., a web server cluster or a particular web server in a cluster) that is used to support the monitored web site (or other type of monitored information that is accessible by a client) can be observed (e.g., to enable capture of the network packets communicated to/from the server). In one embodiment, kernel-level module 401 may execute in the kernel of a web server to collect desired information for web page access transactions, thus forming web Transaction Log 401A. Thus, module 401 may construct Transaction Log 401A directly in the web server's kernel (or directly in the kernel of some other processor-based device arranged on the server side of the network). As described further below, in this example implementation information in Transaction Log 401A may be utilized to reconstruct client web page accesses for evaluation of the client-perceived end-to-end performance in receiving a requested web page.

As described above, a web page is generally composed of one HTML file and some embedded objects, such as images or JAVASCRIPTS. When a client requests a particular web page, the client's browser should retrieve all the page-embedded images from a web server in order to display the requested page. The client browser retrieves each of these embedded images separately. As illustrated by the generic example of FIG. 1, each object of a requested web page is retrieved from a server by an individual HTTP request made by the client. An HTTP request-response pair may be referred to collectively herein as an HTTP "transaction." Entries of Transaction Log 401A contain information about these individual HTTP transactions (i.e., requests/responses). Preferably, all objects of a given web page are stored on a common server, although this is not a requirement for implementing embodiments of the present invention.

Once information about various individual HTTP transactions is collected in Transaction Log 401A, the next step in reconstructing a web page access is to relate the different individual HTTP transactions in the sessions corresponding to a particular web page access. That is, the various different HTTP transactions collected in Transaction Log 401A are related together as logical web pages. In a preferred embodiment, web page access reconstructor module 402 is responsible for grouping the underlying physical object retrievals together into logical web page accesses, and stores them in Web Page Session Log 402A. More specifically, web page access reconstructor module 402 analyzes Transaction Log 401A and groups the various different HTTP transactions that correspond to a common web page access. Thus, Web Page Session Log 402A comprises the HTTP transactions organized (or grouped) into logical web page accesses. Examples of a web page access reconstructor module 402 that may be implemented are described in greater detail in concurrently filed and commonly assigned U.S. Published Patent Application No. 2003/0217162 entitled "SYSTEM AND METHOD FOR RECONSTRUCTING CLIENT WEB PAGE ACCESSES FROM CAPTURED NETWORK PACKETS" and in concurrently filed and commonly assigned U.S. Published Patent Application No. 2003/0217144 entitled "KNOWLEDGE-BASED SYSTEM AND METHOD FOR RECONSTRUCTING CLIENT WEB PAGE ACCESSES FROM CAPTURED NETWORK PACKETS."

After different request-response pairs (i.e., HTTP transactions) are grouped into web page retrieval sessions in Web Page Session Log 402A, performance analysis module 403 may, in certain implementations, be utilized to measure the client-perceived end-to-end response time for a web page download. That is, once the HTTP transactions for a common web page access are grouped together in Web Page Session Log 402A, such grouping of HTTP transactions may be utilized to measure the client-perceived end-to-end performance for each reconstructed web page access, such as in the manner described further in concurrently filed and commonly assigned U.S. Published Patent Application No. 200/0221000 entitled "SYSTEM AND METHOD FOR MEASURING WEB SERVICE PERFORMANCE USING CAPTURED NETWORK PACKETS", the disclosure of which is incorporated herein by reference.

While Transaction Log 401A may comprise any desired network information in various implementations of alternative embodiments, Table 1 below describes in greater detail the format of an entry in HTTP Transaction Log 401A of a preferred embodiment.

TABLE 1

| Field | Value |
| --- | --- |
| URL | The URL of the transaction. |
| Referer | The value of the header field Referer, if it exists. |
| Content Type | The value of the header field Content-Type in the responses. |
| Flow ID | A unique identifier to specify the TCP connection of this transaction. |
| Source IP | The client's IP address. |
| Request Length | The number of bytes of the HTTP request. |
| Response Length | The number of bytes of the HTTP response. |
| Content Length | The number of bytes of HTTP response body. |
| Request SYN timestamp | The timestamp of the SYN packet from the client. |

TABLE 1-continued

| Field | Value |
| --- | --- |
| Request Start timestamp | The timestamp for receipt of the first byte of the HTTP request. |
| Request End timestamp | The timestamp for receipt of the last byte of the HTTP request. |
| Start of Response | The timestamp when the first byte of response is sent by the server to the client |
| End of Response | The time stamp when the last byte of response is sent by the server to the client |
| ACK of Response Timestamp | The ACK packet from the client for the last byte of the HTTP response. |
| Response Status | The HTTP response status code. |
| Via Field | Identification of whether the HTTP field Via is set. |
| Aborted | Identification of whether the TCP connection aborted. |
| Resent Request Packets | The number of packets resent by the client. |
| Resent Response Packet | The number of packets resent by the server. |

The first field provided in the example Transaction Log entry of Table 1 is the URL field, which stores the URL for the HTTP transaction (e.g., the URL for the object being communicated to the client in such transaction). The next field in the entry is the Referer field. As described above with FIG. 1, typically when a web page is requested, an HTML file 102A is first sent to the client, such as a file "index.html", which identifies the object(s) to be retrieved for the web page, such as Object$_1$ and Object$_2$ in the example of FIG. 1. When the objects for the requested web page (e.g., Object$_1$ and Object$_2$) are retrieved by the client via HTTP transactions (in the manner described above with FIG. 1), the Referer field identifies that those objects are embedded in (or are part of) the requested web page (e.g., the objects are associated with the index.html file in the above example). Accordingly, when transactions for downloading various different objects have the same Referer field, such objects belong to a common web page. The HTTP protocol defines such a Referer field, and therefore, the Referer field for a transaction may be taken directly from the captured Network Trace information for such transaction. More specifically, in the HTTP protocol, the referer request-header field allows the client to specify, for the server's benefit, the address (URI) of the resource from which the Request-URI was obtained (i.e., the "referrer", although the header field is misspelled). The referer request-header allows a server to generate lists of back-links to resources for interest, logging, optimized caching, etc. In view of the above, the Referer field of a transaction directly identifies the web page to which the object of such transaction corresponds.

The next field provided in the example entry of Table 1 is the Content Type field, which identifies the type of content downloaded in the transaction, such as "text/html" or "image/jpeg", as examples. The next field in the entry is Flow ID, which is a unique identifier to specify the TCP connection of this transaction. The next field in the entry is Source IP, which identifies the IP address of a client to which information is being downloaded in the transaction.

The next field in the example entry of Table 1 is the Request Length field, which identifies the number of bytes of the HTTP request of the transaction. Similarly, the Response Length field is included in the entry, which identifies the number of bytes of the HTTP response of the transaction. The Content Length field is also included, which identifies the number of bytes of the body of the HTTP response (e.g., the number of bytes of an object being downloaded to a client).

The next field in the example entry of Table 1 is the Request SYN timestamp, which is the timestamp of the SYN packet from the client. As described above, when a client clicks a hypertext link (or otherwise requests a URL) to retrieve a particular web page, the browser first establishes a TCP connection with the web server by sending a SYN packet. If the server is ready to process the request, it accepts the connection by sending back a second SYN packet acknowledging the client's SYN. Only after this connection is established can the true request for a web page be sent to the server. Accordingly, the Request SYN timestamp identifies when the first attempt to establish a connection occurred. This field may be used, for example, in determining the latency breakdown for a web page access to evaluate how long it took for the client to establish the connection with the server.

The next field in the entry is the Request Start timestamp, which is the timestamp for receipt of the first byte of the HTTP request of the transaction. Accordingly, this is the timestamp for the first byte of the HTTP request that is received once the TCP connection has been established with the server. The Request End timestamp is also included as a field in the entry, which is the timestamp for receipt of the last byte of the HTTP request of the transaction.

The next field in the entry is the Start of Response field, which identifies the timestamp when the first byte of the response is sent by the server to the client. The entry next includes an End of Response field, which identifies the timestamp when the last byte of the response is sent by the server to the client. The next field in the entry is ACK of Response timestamp, which is the timestamp of the ACK packet (acknowledge packet) from the client for the last byte of the HTTP response of the transaction. As an example, the Request Start timestamp, Request End timestamp, and ACK of Response timestamp fields may be used (e.g., by performance analysis module 403) in measuring the end-to-end performance perceived by the client for a web page access in certain implementations.

The next field in the example entry of Table 1 is the Response Status field, which is the HTTP response status code. For example, the response status code may be a "successful" indication (e.g., status code 200) or an "error" indication (e.g., status code 404). Typically, upon receiving a client's request for a web page (or object embedded therein), the web server provides a successful response (having status code 200), which indicates that the web server has the requested file and is downloading it to the client, as requested. However, if the web server cannot find the requested file, it may generate an error response (having status code 404), which indicates that the web server does not have the requested file.

The next field in the example entry of Table 1 is the Via field, which is typically set by a proxy of a client. If the client request is received by the server from a proxy, then typically proxies add their request field in the Via field. Thus, the Via field indicates whether it is in fact the original client who requested this file, or who is making this request, rather than a proxy acting on behalf of the client.

The next field in the example entry of Table 1 is the Aborted field, which indicates whether the current transaction was aborted. For example, the Aborted field may indicate whether the client's TCP connection for such transaction was aborted. Various techniques may be used to detect whether the client's TCP connection with the server and the current transaction, in particular, is aborted, such as those described further in concurrently filed and commonly assigned U.S. Published Patent Application No. 2005/0076111 entitled "SYSTEM AND METHOD FOR RELATING ABORTED CLIENT ACCESSES OF DATA TO QUALITY OF SERVICE PROVIDED BY A SERVER IN A CLIENT-SERVER NETWORK", the disclosure of which is incorporated herein by reference.

The next field in the entry is the Resent Request Packets field, which provides the number of packets resent by the client in the transaction. The Resent Response Packet field is the final field in the entry, which provides the number of packets resent by the server in the transaction. These fields may provide information about the network status during the transaction. For instance, if it was necessary for the server to re-send multiple packets during the transaction, this may be a good indication that the network was very congested during the transaction.

In certain implementations, some fields of the HTTP Transaction Log entry may be used to rebuild web pages (e.g., via web page access reconstructor module 402, such as the URL, Referer, Content Type, Flow ID, Source IP, Request Start timestamp, and Response End timestamp fields. Examples of reconstructing web page accesses in this manner are further described in concurrently filed and commonly assigned U.S. Published Patent Application No. 2003/0217162 entitled "SYSTEM AND METHOD FOR RECONSTRUCTING CLIENT WEB PAGE ACCESSES FROM CAPTURED NETWORK PACKETS" and concurrently filed and commonly assigned U.S. Published Patent Application No. 2003/0217144 entitled "KNOWLEDGE-BASED SYSTEM AND METHOD FOR RECONSTRUCTING CLIENT WEB PAGE ACCESSES FROM CAPTURED NETWORK PACKETS." Other fields of the HTTP Transaction Log entry may be used to measure end-to-end performance for a web page access. For example, the Request Start timestamp and the Response End timestamp fields can be used together to calculate the end-to-end response time. The number of resent packets can reflect the network condition.

As an example of network-level information that may be captured and used to populate certain of the above fields of Table 1, consider the following example requests and responses (transaction) for retrieving "index.html" page with the embedded image "img1.jpg" from a web server "www.hpl.hp.com":

```
Transaction 1:
    Request:   Get /index.html HTTP/1.0
        Host: www.hpl.hp.com
    Response:  HTTP/1.0 200 OK
        Content-Type: text/html
Transaction 2:
    Request: Get /img1.jpg HTTP/1.0
        Host: www.hpl.hp.com
        Referer: http://www.hpl.hp.com/index.html
    Response: HTTP/1.0 200 OK
        Content-Type: image/jpeg
```

In the above example, the first request is for the HTML file index.html. The content-type field in the corresponding response shows that it is an HTML file (i.e., content type of "text/html"). Then, the next request is for the embedded image img1.jpg. The request header field referer indicates that the image is embedded in index.html. The corresponding response shows that the content type for this second transaction is an image in jpeg format (i.e., content type of "image/jpeg"). It should be noted that both of the transactions above have a status "200" (or "OK") returned, which indicates that they were successful.

A preferred embodiment implements a kernel-level module for collecting information for network transactions within a STREAMS-based operating system. Many leading commercial operating systems, such as SOLARIA, HP-UX, AIX, MAC 05, and WINDOWS NT, have a STREAMS-based TCP/IP implementation that offers a framework that allows for plug-in modules to be implemented within the TCP/IP stack. STEAMS is a well known framework and is therefore described only briefly hereafter (see e.g., "UNIX System V Release 4 Programmer's Guide: STREAMS", UNIX Press. 1990).

Figure 5:
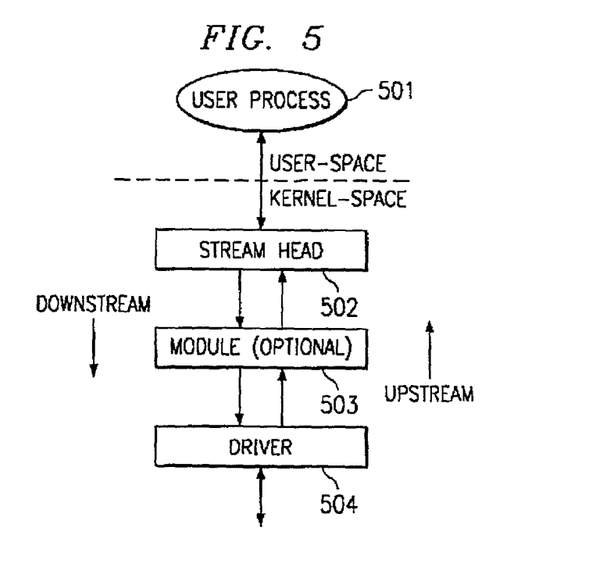
FIG. 5 shows an overview of the STREAMS framework in which a preferred embodiment of the present invention is implemented.

In general, STREAMS is a modular framework for developing the communication services. An overview of the STREAMS framework in which a preferred embodiment may be implemented is shown in FIG. 5. As shown, each stream generally has a stream head 502 and a driver 504. A stream may further include one or more modules 503 implemented between stream head 502 and driver 504. Such modules 503 exchange information through messages. Messages can flow in two directions: downstream or upstream. Each module has a pair of queues: write queue and read queue. When a message passes through a queue, the service routine for this queue is called to process the message. The service routine may drop a message, pass a message, change the message header, and/or generate a new message.

Stream head 502 is responsible for interacting with user process(es) 501. It accepts requests from user process(es) 501, translates them into appropriate messages, and sends the messages downstream. Stream head 502 is also responsible for signaling to user process(es) 501 when new data arrives or some unexpected event happens.

Figure 6:
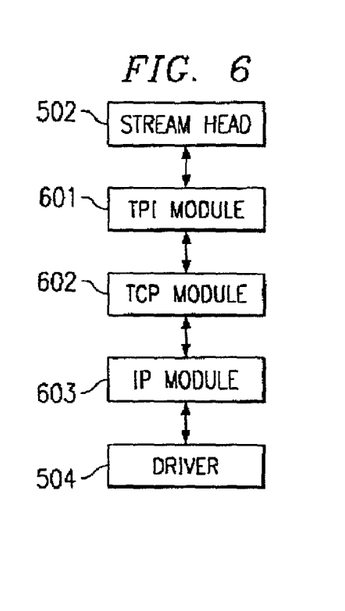
FIG. 6 shows a block diagram of the standard STREAMS-based modules used for TCP/IP STREAMS-based implementation.

As mentioned above, many popular operating systems utilize the STREAMS framework to implement a TCP/IP stack, thus enabling TCP/IP communication. FIG. 6 illustrates a block diagram of the standard STREAMS-based modules used for TCP/IP STREAMS-based implementation. As shown in FIG. 6, to implement the TCP/IP stack in the STREAMS framework of FIG. 5, Transport Provider Interface (TPI) module 601, TCP module 602, and IP module 603 are implemented between stream head 502 and driver 504. A transport provider interface (TPI) specification defines the message interface between the TCP module 602 and the stream head module 502. A data link provider interface (DLPI) specification defines the message interface between driver module 514 and the IP module 603. These two specifications, TPI and DLPI, define the message format, valid sequences of messages, and semantics of messages exchanged between these neighboring modules.

For example, when TCP module 602 receives a SYN request for establishing a communication session, TCP module 602 sends a "T_CONN_IND" message upstream. Under the TPI specification, TCP module 602 should not proceed until it gets the response from the application layer. However, in one embodiment, in order to be compatible with Berkeley Software Distribution (BSD) implementation-based applications, TCP module 602 continues the connection establishment procedure with the client. When the application decides to accept the connection, it sends the "T_CONN_RES" downstream on the listen stream. It also creates another stream to accept this new connection, and TCP module 602 attaches a TCP connection state to this new stream. Data exchange then continues on the accepted stream until either end closes the connection.

Figure 7:
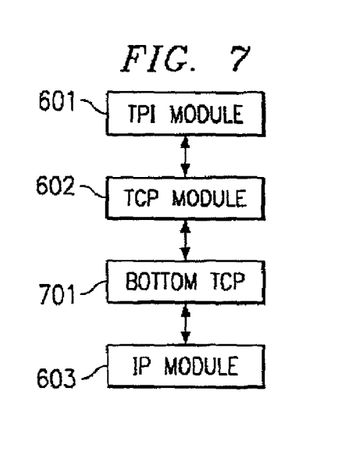
FIG. 7 shows a block diagram of a preferred embodiment of the present invention implementing a kernel-level module in the STREAMS-based TCP/IP stack for collecting desired information for network transactions.

A preferred embodiment of the present invention implements a new STREAMS module, which may be referred to herein as a Transaction Log Collector module 401 (see FIG. 4), that is operable to collect information for network transactions and construct web Transaction Log 401A. According to its relative position in the existing TCP/IP stack, such Transaction Log Collector module may be referred to herein as BTCP (BottomTCP), because such module is plugged in between IP and TCP on the network stack. For instance, FIG. 7 shows a block diagram of a preferred embodiment, which includes BTCP module 701 implemented between TCP module 602 and IP module 603 of the TCP/IP stack. Thus, in a preferred embodiment, BTCP module 701 resides on the web server's kernel stack and monitors the port where the web server is running.

Preferably, BTCP module 701 monitors information communicated between TCP module 602 and IP module 603. As described in greater detail hereafter, BTCP module 701 preferably establishes a connection control block for each TCP connection established, and BTCP module 701 monitors each TCP connection to compile desired information for transactions performed via such TCP connection.

Figure 8:
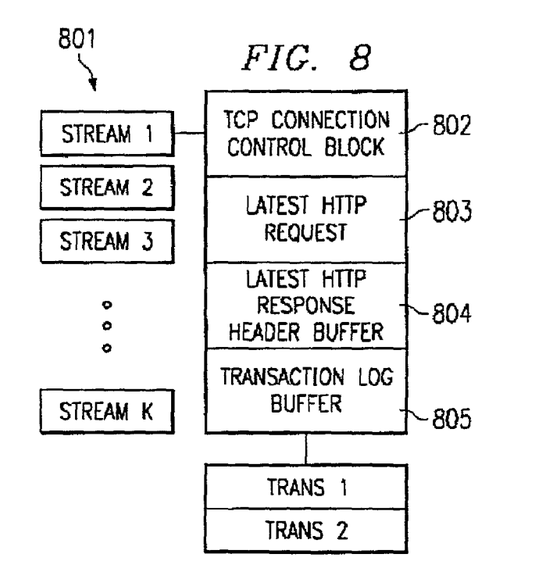
FIG. 8 shows an example block diagram of a TCP Connection Control Block of a preferred embodiment.

In a preferred embodiment, BTCP module 701 is operable to allocate a Connection Control Block for each TCP connection established with the server on which such BTCP module 701 is implemented. Such Connection Control Block is utilized to monitor its corresponding TCP connection and compile desired information for network transactions conducted via such TCP connection. Turning to FIG. 8, an example block diagram of a TCP Connection Control Block of a preferred embodiment is shown. As shown, various TCP connections or "streams" may be established with a server, such as streams 801. For each stream 801, BTCP module 701 may allocate a Connection Control Block. For instance, Connection Control Block 802 is allocated for "stream 1" in the example of FIG. 8. The allocated connection control block executes to monitor the network packets communicated through the TCP connection of "stream 1" and compile desired information for network transactions conducted through such TCP connection. For example, Connection Control Block 802 preferably comprises a buffer 803 that is utilized to store information from network packets for the latest HTTP request. That is, as incoming network packets (or request packets) are received by BTCP module 701 for "stream 1" information from such incoming network packets is compiled in buffer 803. Further, Connection Control Block 802 preferably comprises a buffer 804 that is utilized to store information from network packets for the latest HTTP response (i.e., that corresponds to the request of buffer 803). That is, as outgoing network packets (or response packets) are received by BTCP module 701 for "stream 1" information from such outgoing network packets is compiled in buffer 804.

Figure 9A:
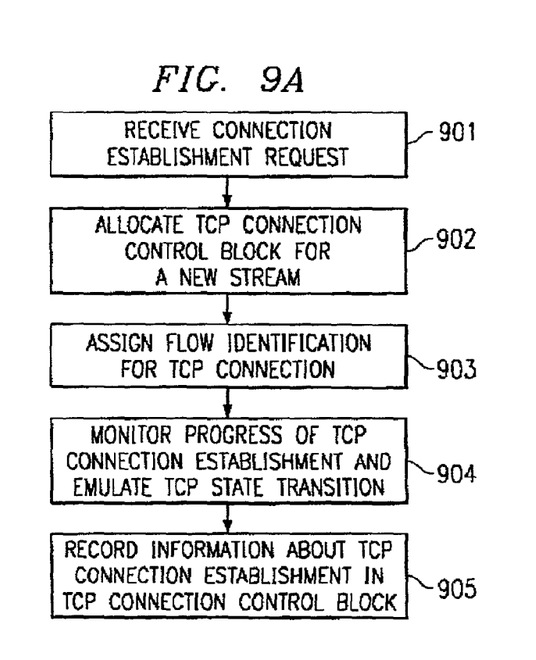
FIGS. 9A-9D show example operational flow diagrams for the operation of the kernel-level module of a preferred embodiment for collecting desired information for network transactions.

Once information is fully received for a request and corresponding response (in buffers 803 and 804), the desired information for such transaction is stored in transaction log buffer 805. Transaction log buffer 805 may, for example, be a circular buffer that stores desired information for various transactions conducted via stream 1, such as transactions Trans1 and Trans2 of FIG. 8. Preferably Turning now to FIGS. 9A-9D, operation of a BTCP module 701 in accordance with a preferred embodiment of the present invention is described in conjunction with the example flow diagrams shown. FIG. 9A shows an example operational flow diagram for BTCP module 701 in establishing a TCP connection control block for monitoring such TCP connection in accordance with a preferred embodiment. As shown, upon BTCP module 701 receiving a connection establishment request 901 (from IP module 603), BTCP module 701 allocates a connection control block (e.g., connection control block 802 of FIG. 8) for monitoring the establishment of the requested TCP connection. That is, upon a client sending a connection establishment request to the server on which BTCP module 701 is implemented, it receives such request (via IP module 603) in operational block 901. At operational block 902, BTCP module 701 allocates a TCP connection control block for the newly requested stream (TCP connection). An example of such TCP connection control block of a preferred embodiment is shown above in FIG. 8. At operational block 903, BTCP module 701 assigns a Flow ID for this newly requested TCP connection.

As described above with the example of FIG. 8, in a preferred embodiment, this newly established connection control block comprises compiled information for web transactions made via this TCP connection. To compile such information for the TCP connection, BTCP module 701 monitors the progress of the TCP connection establishment and emulates TCP state transition in operational block 904. That is, in a preferred embodiment BTCP module 701, and more particularly the allocated Connection Control Block for the requested TCP connection, compiles information regarding the establishment of the requested TCP connection, such as information for determining the amount of time required for establishing such TCP connection.

For example, in a preferred embodiment, BTCP module 701 records the timestamps and information about the following: Request SYN packet, Response SYN packet, the client IP address of each transaction, and information regarding whether the TCP connection is aborted by the client. To determine whether a connection is aborted by the client from the network packet-level information collected from the web server by BTCP module 701, a preferred embodiment analyzes the TCP/IP packets received via the TCP connection to detect the following situations that are indicative of a client-aborted connection: 1) a RST packet sent by an HTTP client to the server that explicitly indicates the aborted connection, or 2) a FIN packet with ACK sent by an HTTP client to the server where the acknowledged sequence number is less than the observed maximum sequence number sent from the server. If either of the above situations are detected, BTCP module 701 determines that the TCP connection was aborted by the client. A system and method for determining client aborted connections is further described in U.S. Published Patent Application No. 2005/0076111 titled "SYSTEM AND METHOD FOR RELATING ABORTED CLIENT ACCESSES OF DATA TO QUALITY OF SERVICE PROVIDED BY A SERVER IN A CLIENT-SERVER NETWORK", and such method may be implemented in a preferred embodiment of the present invention to enable BTCP module 701 to compile information regarding aborted connections. At operational block 905, BTCP module 701 records the compiled information about the TCP connection establishment (e.g., the request SYN packet timestamp, response SYN packet timestamp, etc.) in the Connection Control Block allocated for this TCP connection.

Figure 9B:
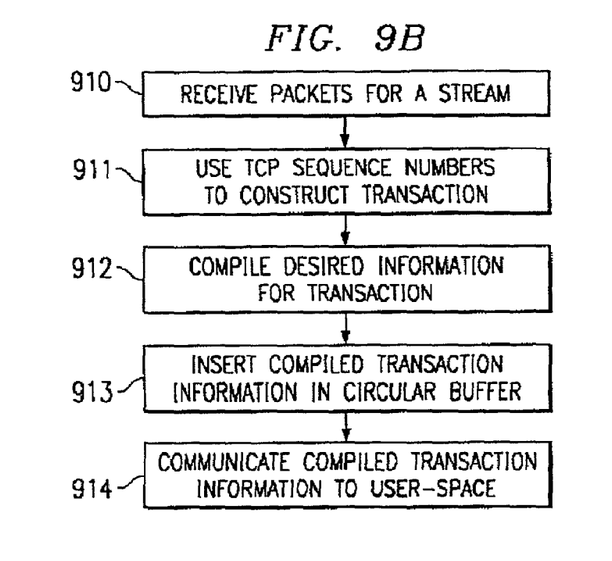

Not only does BTCP module 701 record information about the establishment of a requested TCP connection, but it also compiles desired information about transactions performed through such TCP connection. Thus, once the TCP connection is established, BTCP module 701 monitors such connection and records desired information for transactions conducted via such connection to the connection's Control Block (e.g., control block 802 for the connection). FIG. 9B shows an example flow diagram for the operation of BTCP module 701 in monitoring an established connection and compiling desired information for transactions in accordance with a preferred embodiment. As shown, BTCP module 701 receives packets along each established stream (TCP connection) in operational block 910. That is, BTCP module 701 receives incoming packets (or upstream packets) received from a client via IP module 603, and BTCP module 701 receives, from TCP module 602, outgoing packets (or downstream packets) being sent from the server to the client.

In operational block 911, BTCP module 701 analyzes the TCP sequence numbers of the received packets to construct the packets into their corresponding transaction. That is, BTCP module 701 analyzes the received packets' TCP header and uses the TCP sequence numbers for both the incoming and outgoing packets to construct a reliable flow of data by reordering the packets; discarding duplicate packets, and truncating the overlapping packets, just as the TCP module 602 does. In operational block 912, BTCP module 701 compiles the desired information (e.g., information for web transaction log 401A) for the constructed transactions conducted via each stream. That is, BTCP module 701 retrieves and/or computes the desired information for a transaction detected on a particular TCP connection (or "stream") and compiles the desired information in the Connection Control Block (e.g., Connection Control Block 802 of FIG. 8) allocated for the particular TCP connection. An example operation of BTCP module 701 in compiling the desired information for a transaction is described in greater detail below in conjunction with FIGS. 9C and 9D.

In a preferred embodiment, the compiled information for a transaction is inserted from the Connection Control Block 802 to a circular buffer 805 of fixed size when the transaction is finished. If the circular buffer 805 is full, the oldest transaction is removed from the buffer and the latest transaction is appended thereto. Thus, in operational block 913 BTCP module 701 inserts the compiled information from the Connection Control Block 802 to a circular transaction buffer 805. In operational block 914, BTCP module 701 may communicate the compiled transaction information to the user-space (e.g., to disk and/or to an application program for further processing of such information). Preferably, transaction buffer 805 is a global buffer that stores transactions for all streams monitored by module 701. Preferably, an interface is provided so that a program executing in the user space may retrieve the compiled transaction information (e.g., a compiled web Transaction Log 401A) from the transaction buffer 805 in the kernel. Any suitable kernel-user level communication mechanism may be used for implementing the interface, such as pseudo device driver as an example.

Figure 9C:
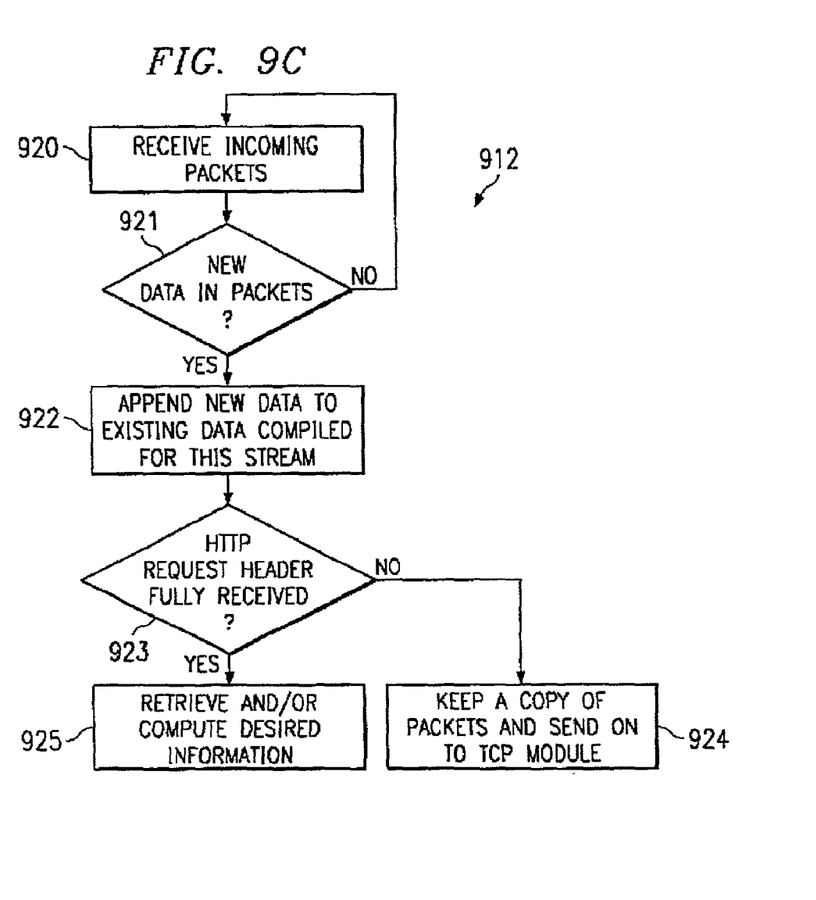

Turning now to FIG. 9C, operational block 912 is shown in greater detail. More specifically, an example operational flow for BTCP module 701 compiling desired transaction information from incoming network packets (i.e., request packets) for a transaction. As shown in block 920, BTCP module 701 receives incoming network packets from a client. That is, BTCP module 701 receives incoming network packets via IP module 603 for a particular TCP connection (stream). In block 921, BTCP module 701 analyzes the received packets to determine whether they include any new data not previously received for this transaction. For instance, the received incoming packets may include duplicative and/or overlapping packets that include data that has already been received by BTCP module 701. Such determination may be made in block 921 by, for example, analyzing the TCP sequence numbers of the received packets. If it is determined that new data is included in the received incoming packets, operation advances to block 922 whereat BTCP module 701 appends the new data to the existing data being compiled (in the Connection Control Block) for the TCP connection (stream) on which the packets where received. For example, the new data is appended to the latest HTTP request information 803 being compiled for the TCP connection on which the packets were received.

Thereafter, in block 923 it is determined whether the HTTP request header has been fully received for this request (i.e., the request to which the received incoming packets correspond). If it is determined in block 923 that the request header has not been fully received, operation advances to block 924 whereat BTCP module 701 keeps a copy of the received packets in the connection's Control Block, and passes the received packets on to the TCP module 602. If, on the other hand, it is determined at block 923 that the request header has been fully received, then operation advances to block 925 whereat BTCP module 701 retrieves and/or computes from the collected incoming network packets the desired information for the received request of a transaction. For example, in a preferred embodiment, BTCP module 701 retrieves and/or computes the value of the following fields of web Transaction Log 401A: Request Start Time, Request End Time, Request URL, Referer field, Via field, and Request Length. Preferably, BTCP module 701 also updates the Resent Packets by Client field of the web Transaction Log 401A for this transaction by detecting and recording the number of received incoming packets having duplicative/overlapping TCP sequence numbers (as detected in operational block 921).

Figure 9D:
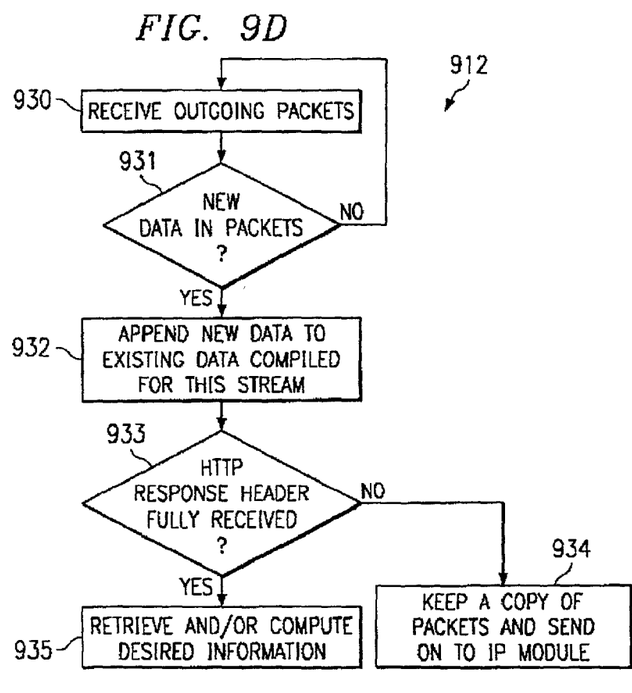

BTCP module 701 also monitors the outgoing packets (i.e., response packets) for each TCP connection. Turning now to FIG. 9D, operational block 912 is further shown. More specifically, an example operational flow for BTCP module 701 compiling desired transaction information from outgoing network packets for a transaction. As shown in block 930, BTCP module 701 receives outgoing network packets being sent from the server to a client. That is, BTCP module 701 receives outgoing network packets via TCP module 602 for a particular TCP connection (stream). In block 931, BTCP module 701 analyzes the received packets to determine whether they include any new data not previously received for this transaction. For instance, the received outgoing packets may include duplicative and/or overlapping packets that include data that has already been received by BTCP module 701. Such determination may be made in block 931 by, for example, analyzing the TCP sequence numbers of the received packets. If it is determined that new data is included in the received outgoing packets, operation advances to block 932 whereat BTCP module 701 appends the new data to the existing data being compiled (in the Connection Control Block) for the TCP connection (stream) on which the packets where received. For example, the new data is appended to the latest HTTP response header buffer 804 being compiled for the TCP connection on which the packets were received.

Thereafter, in block 933 it is determined whether the HTTP response header has been fully received for this response (i.e., the response to which the received outgoing packets correspond). If it is determined in block 933 that the response header has not been fully received, operation advances to block 934 whereat BTCP module 701 keeps a copy of the received packets in the connection's Control Block, and passes the received packets on to the IP module 603. If, on the other hand, it is determined at block 933 that the response header has been fully received, then operation advances to block 935 whereat BTCP module 701 retrieves and/or computes from the collected outgoing network packets the desired information for the received response of a transaction. For example, in a preferred embodiment, BTCP module 701 retrieves and/or computes the value of the following fields of web Transaction Log 401A: Response Start Time, Response End Time, Content Type, Response Length, Content Length, and Resent Packets by the Server.

Typically, the web server sets the Content Length field in the HTTP response header. This Content Length information is used by BTCP module 701 in a preferred embodiment to delimit the HTTP response data for different HTTP requests along the same TCP connection (persistent connection). This field may also be used to compute the timestamp of the Last ACK field in the web transaction log 401A.

In view of the above, embodiments of the present invention provide a kernel-level module that is operable to compile information about network transactions. More specifically, in a preferred embodiment, a kernel-level module may be implemented on the server side of a client-server network (e.g., on a web server) to monitor network packets communicated to/from the server and compile information for network transactions conducted with the server. A preferred embodiment provides many technological advantages over prior art techniques for compiling information for network transactions. One advantage of a preferred embodiment is that the server software does not need to be modified in order to compile information for network transactions. That is, the kernel-level module may be implemented transparent to the server software such that the server software is not required to be modified.

Additionally, compared to the prior art technique described above in conjunction with FIG. 2, which uses a network packet sniffer tool, such as tcpdump, to capture raw network data (as a Network Trace) and then organize the raw network data into corresponding transactions, a preferred embodiment incurs much less disk operations and may greatly reduce the amounts of data copied between the user and kernel space. A preferred embodiment may greatly reduce the amounts of data copied between the user and kernel space because the actual desired information for network transactions may be much less than the raw network information captured by tcpdump. For example, a desired web transaction log may be about 100 times smaller than the raw network packet traffic stored in the network trace.

Further, embodiments of the present invention may be capable of dynamically monitoring designated URLs. That is, a kernel-level module may be utilized to analyze network packets and compile information for network transactions involving particular URLs. Thus, information about desired URLs may be filtered out of received network packets for various different URLs, which may further reduce the amount of data required to be copied between the kernel and user space. To implement such a filter using the packet sniffer-based approach of the prior art (e.g., tcpdump) requires analyzing the content of the captured network information at the user level. That is, all the web traffic has to be copied from the kernel space to the user space to enable the content of captured packets to be analyzed (e.g., to filter out information for desired URLs), which represents a significant performance overhead. The STREAMS-based approach of a preferred embodiment can avoid such data copying between the kernel and the user space by performing the corresponding actions (i.e., analysis of network packet content) directly in the kernel space of the server.

Also, by having the Transaction Log collection module implemented in the server's kernel space, some additional differentiated services can be implemented. For example, specially-tailored priority strategies (e.g., based on predefined priority of the given clients/documents) can be implemented when sending the corresponding clients/documents responses out from the server. For instance, policies may be configured by server-side operators that may be used by the kernel-level module to give priority in sending responses for "premier" customers (clients) accessing the server or for a certain URL being accessed by a client, as examples. In prioritizing delivery of requested information from the server to a client, the kernel-level module may control the queue/buffer of each stream to give higher priority in sending of certain packets therein (e.g., packets for a given client or packets for a given URL being accessed). Because embodiments of the present invention enable a kernel-level module to construct a transaction (e.g., a client request and corresponding server response), the kernel-level module may be implemented to prioritize the response of a transaction based on information about the client request of such transaction (e.g., whether the client request is from a particular client or whether the client request is requesting access to particular information, such as a particular URL).

For example, a particular client may be considered as a "premier" client for some reason (e.g., the client is a frequent purchaser of products through the server), and the kernel-level module may, in certain implementations, be implemented to recognize an access by such "premier" client and give higher priority to the packets being sent to such client. As another example, a server may have various different web pages included thereon, such as a informational web page and a web page for purchasing products, and the kernel-level module may be implemented to give higher priority to the packets being sent out to clients accessing the web page for purchasing products than for the packets for the informational web page, thereby giving higher priority to packets being transmitted for clients seeking to actually purchase a product than for clients seeking information. Various other types of priority schemes may be implemented in the kernel-level module.

Further, specially-tailored scheduling strategies can be implemented in the kernel-level module to send the corresponding clients/documents responses in a special order. For instance, the transfer of those documents that have a better response time may be delayed in order to expedite the transmission of slower responses. As still a further example, specially-tailored admission control strategies based on observed performance characteristics (e.g., end-to-end performance characteristics) can be implemented. For instance, basic heuristics may be implemented in the kernel-level module to use captured network-level information for transactions to determine whether to modify the scheduling of sending responses.

For example, suppose a web page comprises 5 objects, and further suppose that the response for sending the first 3 objects of such web page to a particular client is above a given threshold amount. In this case, the kernel-level module may have some heuristics implemented therein to detect that the transactions for communicating the first 3 objects to a client took too long (e.g., were above a given threshold amount) and may therefore adjust the scheduling of sending responses to clients to give higher priority to the responses for sending the last 2 objects of the web page to this particular client in an attempt to improve the overall end-to-end response time for the web page.

That is, while the web page access reconstructor module 402 has been described above as being capable of analyzing Transaction Log 401A and grouping the various different HTTP transactions that correspond to a common web page access, the kernel-level module may, in certain implementations, have at least a limited capability for identifying transactions that correspond to a common web page access. For instance, the kernel-level module may include heuristics to monitor the network-level information acquired for transactions to determine whether the requests of the transactions are received from the same IP address, whether the transactions use the same connection (or stream), and/or whether the "Referer" field of the transactions identify a common web page, as examples, in order to implement at least a basic approach for relating transactions of a common web page access. As the transactions for a common web page access are related together, the kernel-level module may be implemented to adjust the scheduling of its responses for such related transactions in an attempt to provide a desired level of performance for the web page access.

A preferred embodiment implements a kernel-level module in the STREAMS-based TCP/IP stack of a server. This design has a number of performance benefits and advantages compared to prior art approaches for compiling information for network transactions. One advantage is its portability. STREAMS-based TCP/IP modules are independent of their internal implementation. There are well-defined standards to regulate the exchange of messages between modules via an interface, and as long as this interface does not change, any implementation change within a module does not require changes to other modules. A new web Transaction Collector module implemented in the STREAMS-based TCP/IP does not change any data structures or field values maintained by the original TCP/IP modules, and no direct function calls are made: all the interactions between the new module and the original TCP/IP modules are message-based. Such implementations provide for portability between different operating systems since the web Transaction Log Collector module 701 can be ported to other STREAMS-based TCP/IP protocol implementation.

Another advantage of the STREAMS-based implementation of a preferred embodiment is its flexibility: A new web Transaction Log Collector module can be dynamically loaded and unloaded as a DLKM (Dynamically Loadable Kernel Module) module without service interruption. A further advantage of the STREAMS-based implementation of a preferred embodiment is its transparency. No application modification is necessary to take advantage of the new kernel-level module. This is a valuable feature for some applications where no source code is available. Still a further advantage of the STREAMS-based implementation of a preferred embodiment is its efficiency. The new web Transaction Log Collector module 701 only peeks into the kernel-level message traffic, imposing a minimum performance overhead.

As described above, a preferred embodiment provides a kernel-level module that executes to compile the desired information for network transactions, such as compiling a web Transaction Log 401A, which may then be communicated from the kernel-level of a web server to the user-space level. In alternative embodiments, a portion of the desired information for network transactions may be acquired at the user-level (e.g., via web server software) and a portion of the desired information for network transactions may be acquired by a kernel-level module.

For example, the web server software may be implemented to retrieve web-related fields and timestamps via web server application software. Kernel-level module 701 may be implemented to retrieve the network-related fields in the network level, and both the information acquired at the user-level and the information acquired at the kernel-level may be combined to form the desired information (e.g., to form the web Transaction Log 401A). Popular web server software, such as Apache, Netscape, and IIS, provide well-defined modular mechanisms and APIs to change/modify/extend the standard behavior of the web request processing.

Conceptually, computer-executable software code may be added in the request and response processing part of the web server software to derive related HTTP fields (i.e., fields related to the request and response processing) and the corresponding timestamps, and write such information to the web Transaction Log 401A. In particular, the following fields and timestamps can be obtained via additional software modules implemented in the web server software: Request URL, Referer field, Via field, Content Type, Client IP address, Request Length, Response Length, Response STATUS, Response Start Time, and Response End Time. The remainder of the desired fields (e.g., of Table 1 described above) can be obtained from the network level via kernel module 701. This alternative approach provides several benefits and advantages. First, it avoids the reconstruction of TCP connections at the user-space level, which is required in the prior art technique described above in conjunction with FIG. 2. Additionally, it saves the additional efforts on HTTP header parsing. Further, this alternative embodiment enables information to be acquired for encrypted connections. That is, because information may be acquired in the web server software, information for encrypted connections may be acquired that would not otherwise be available at the network level because the information is encrypted at that level.

A disadvantage of this alternative approach is that the web server software can not measure the activity inside the kernel. Thus, time stamps may be inaccurate if the web server software does not consider the overhead incurred by the network. For instance, a request might arrive at the web server software that has been waiting in the kernel queue before the web server software sees it.

Figure 10:
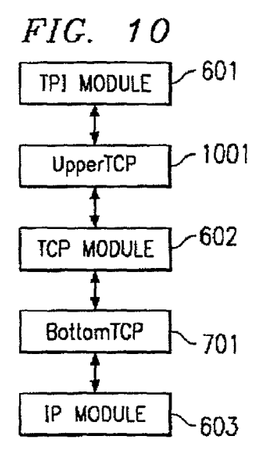
FIG. 10 shows a block diagram of an alternative embodiment of the present invention implementing two kernel-level modules in the STREAMS-based TCP/IP stack for collecting desired information for network transactions.

In a further alternative embodiment, two STREAMS modules may be implemented in the STREAMS-based TCP/IP stack in the manner shown in FIG. 10. As shown in FIG. 10, BTCP module 701 may be implemented below the TCP module 602 as described above, and another module, referred to as UTCP (Upper TCP) module 1001, may be plugged in above (i.e. upstream from) TCP module 602.

In this alternative implementation, BTCP module 701 is not required to deal with packets in order to analyze the HTTP request header and HTTP response header. Rather, UTCP module 1001 analyzes the HTTP requests and responses received by the TCP module 602. In this sense, the BTCP module 701 need not duplicate the efforts of the TCP module 602 in reconstructing network packets into their corresponding requests and responses. However; BTCP module 701 and UTCP module 1001 need to coordinate their efforts in order to acquire some timestamps, like the timestamps of the last ACK sent by client, and thus more complicated communication between UTCP and BTCP is required. That is, certain network-level information (e.g., certain fields of Table 1) may be captured by BTCP module 701 and certain other network-level information (e.g., certain other fields of Table 1) may be captured by UTCP module 1001, and the captured network-level information for a given transaction are then related together. For instance, certain network-level information is seen by BTCP module 701, but is not seen by UTCP module 1001, such as the connection setup time and number of resent packets. Thus, the BTCP module 701 may capture this network-level information, while the UTCP module 1001 captures such information as the Referer field, Content type, etc. for the transaction. It should be understood that each connection (or stream) is uniquely identified by a client IP address and client port number, which may be used to relate the network-level information captured by the BTCP with the network-level information captured by the UTCP for a given transaction.

When implemented via computer-executable instructions, various elements of the present invention, such as kernel-level collector module(s) 701 (of FIG. 7) and/or 1001 (of FIG. 10), are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information. For instance, kernel-level module 701 may be implemented as software code stored to the server's hard drive.

Figure 11:
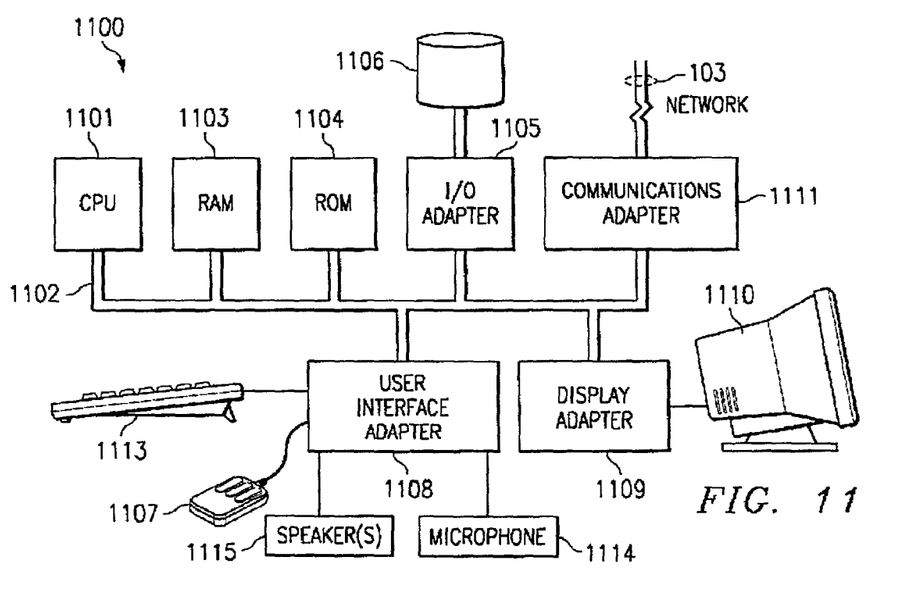
FIG. 11 shows an example computer system on which embodiments of the present invention may be implemented.

FIG. 11 illustrates an example computer system 1100 adapted according to embodiments of the present invention. Central processing unit (CPU) 1101 is coupled to system bus 1102. CPU 1101 may be any general purpose CPU. Suitable processors include without limitation INTEL's PENTIUM® 4 processor, for example. However, the present invention is not restricted by the architecture of CPU 1101 as long as CPU 1101 supports the inventive operations as described herein. CPU 1101 may execute the various logical instructions according to embodiments of the present invention. For example, CPU 1101 may execute machine-level instructions according to the exemplary operational flow described above in conjunction with FIG. 9.

Computer system 1100 also preferably includes random access memory (RAM) 1103, which may be SRAM, DRAM, SDRAM, or the like. Computer system 1100 may utilize RAM 1103 to store the Transaction Log 401A and/or Web Page Session Log 402A, as examples. Computer system 1100 preferably includes read-only memory (ROM) 1104 which may be PROM, EPROM, EEPROM, or the like. RAM 1103 and ROM 1304 hold user and system data and programs as is well known in the art.

Computer system 1100 also preferably includes input/output (I/O) adapter 1105, communications adapter 1111, user interface adapter 1108, and display adapter 1109. I/O adapter 1105 and/or user interface adapter 1108 may, in certain embodiments, enable a user to interact with computer system 1100 in order to input information.

I/O adapter 1105 preferably connects to storage device(s) 1106, such as one or more of hard drive, compact disc (CD) drive, floppy disk drive, tape drive, etc. to computer system 1100. The storage devices may be utilized when RAM 1103 is insufficient for the memory requirements associated with storing Transaction Log 401A and/or Web Page Session Log 402A. Communications adapter 1111 is preferably adapted to couple computer system 1100 to network 103. User interface adapter 1108 couples user input devices, such as keyboard 1113, pointing device 1107, and microphone 1114 and/or output devices, such as speaker(s) 1115 to computer system 1100. Display adapter 1109 is driven by CPU 1101 to control the display on display device 1110.

It shall be appreciated that the present invention is not limited to the architecture of system 1100. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

It should be understood that while a preferred embodiment is described above as implementing a kernel-level module for capturing information for network transactions in conjunction with a web page access reconstructor module for reconstructing client web page accesses, in alternative embodiments such a kernel-level module for capturing information for network transactions may be implemented for other applications. Thus, a kernel-level module as described herein is not limited in application to capturing transaction information for reconstructing web page accesses, but may instead (or in addition) be used to capture transaction information for other types of applications that are based on TCP or other connection-based communication protocol.

What is claimed is:

1. A method for compiling desired information for network transactions comprising:
   capturing network-level information in a kernel-level module of a processor-based device arranged on a server-side of a client-server communication network;
   relating, by said kernel-level module, said captured network-level information to a corresponding one of at least one transaction conducted between a client and a server via said client-server communication network, wherein said transaction comprises a request from said client to said server and a response to said client from said server; and
   using said captured network-level information to compile, in said kernel-level module, desired information for said corresponding.

2. The method of claim 1 wherein said processor-based device is said server.

3. The method of claim 1 wherein said network-level information comprises network packets for said at least one network transaction.

4. The method of claim 1 further comprising:
   said kernel-level module monitoring a TCP connection of said processor-based device to compile said desired information from incoming and outgoing network packets for a network transaction of said TCP connection.

5. The method of claim 1 wherein said desired information comprises a web transaction log.

6. The method of claim 1 wherein said at least one network transaction is a transaction of a client access of a web page on said server.

7. The method of claim 6 wherein said desired information comprises information from which said client access of a web page can be reconstructed.

8. The method of claim 1 further comprising:
   adjusting scheduling of responses from the server to clients based at least in part on the captured network-level information.

9. The method of claim 1 further comprising:
   communicating said desired information from the kernel-level to user-level space of said processor-based device.

10. The method of claim 9 further comprising:
    in said user-level space, using said desired information to reconstruct a client access of said server.

11. The method of claim 10 wherein said client access of said server comprises a client access of a web page.

12. The method of claim 1 further comprising:
    implementing at least an IP module and a TCP module in the kernel-level of said processor-based device to form a TCP/IP stack.

13. The method of claim 12 wherein said kernel-level module that captures said network-level information is arranged communicatively between said IP module and TCP module.

14. The method of claim 1 wherein said transaction comprises an HTTP transaction.

15. The method of claim 1 wherein said transaction comprises a plurality of packets, said relating comprising:
    correlating said plurality of packets to their corresponding transaction.

16. The method of claim 1 wherein said transaction comprises a plurality of packets, and wherein said desired information is determined from said plurality of packets, said relating comprising:
    correlating said desired information to the corresponding transaction that comprises said packets from which said desired information is determined.

17. The method of claim 1 wherein said desired information comprises at least one selected from the group consisting of:
    Uniform Resource Locator (URL) accessed by said at least one network transaction, value of Referer header field of said at least one network transaction, value of Content Type header field of said at least one network transaction, value of Flow Identification of said at least one network transaction, client's Internet Protocol (IP) address of said at least one network transaction, number of bytes of a client request of said at least one network transaction, number of bytes of server response of said at least one network transaction, number of bytes of content of server response of said at least one network transaction, timestamp of SYN packet from the client of said at least one network transaction, timestamp for receipt of the first byte of a client request of said at least one network transaction, timestamp for receipt of the last byte of a client request of said at least one network transaction, timestamp of when the first byte of a response is sent by the server in said at least one network transaction, timestamp of when the last byte of a response is sent by the server to the client in said at least one network transaction, timestamp of receipt of ACK packet by server for the last byte of the server's response in said at least one network transaction, response status code of said at least one network transaction, identification of whether Via field is set for said at least one network transaction, number of packets resent by the client in said at least one network transaction, and number of packets resent by the server in said at least one network transaction.

18. A method for compiling desired information for network transactions comprising:
    capturing network-level information in a kernel-level module of a processor-based device arranged on a server-side of a client-server communication network; and
    using said captured network-level information to compile, in said kernel-level module, desired information for at least one network transaction conducted between a client and a server via said client-server communication network, wherein said desired information comprises at least one selected from the group consisting of:
    Uniform Resource Locator (URL) accessed by said at least one network transaction, value of Referer header field of said at least one network transaction, value of Content Type header field of said at least one network transaction, value of Flow Identification of said at least one network transaction, client's Internet Protocol (IP) address of said at least one network transaction, number of bytes of a client request of said at least one network transaction, number of bytes of server response of said at least one network transaction, number of bytes of content of server response of said at least one network transaction, timestamp of SYN packet from the client of said at least one network transaction, timestamp for receipt of the first byte of a client request of said at least one network transaction, timestamp for receipt of the last byte of a client request of said at least one network transaction, timestamp of when the first byte of a response is sent by the server in said at least one network transaction, timestamp of when the last byte of a response is sent by the server to the client in said at least one network transaction, timestamp of receipt of ACK packet by server for the last byte of the server's response in said at least one network transaction, response status code of said at least one network transaction, identification of whether Via field is set for said at least one network transaction, number of packets resent by the client in said at least one network transaction, and number of packets resent by the server in said at least one network transaction.

19. A method for compiling desired information for network transactions comprising:
implementing a kernel-level module in a STREAMS-based network stack of a server, wherein said kernel-level module is operable to monitor a network connection to said server, compile desired information for network transactions conducted through said network connection, and relate said desired information to corresponding ones of said network transactions, wherein each of said network transactions comprises a request and a response.

20. The method of claim 19 wherein said STREAMS-based network stack comprises an TCP/IP stack.

21. The method of claim 20 wherein said TCP/IP stack comprises an IP module and a TCP module.

22. The method of claim 21 wherein said kernel-level module is arranged communicatively between said IP module and said TCP module.

23. The method of claim 19 wherein said kernel-level module captures network packets for said network transactions.

24. The method of claim 19 wherein said network connection comprises a TCP connection and wherein said kernel-level module compiles said desired information from incoming and outgoing network packets for a network transaction conducted via said TCP connection.

25. The method of claim 19 wherein said desired information comprises a web transaction log.

26. The method of claim 19 wherein said request is a request from a client to said server, and wherein said response is a response to said client from said server.

27. The method of claim 19 wherein said network transactions comprise a client access of a web page on said server.

28. The method of claim 27 wherein said desired information comprises information from which said client access of a web page can be reconstructed.

29. The method of claim 19 further comprising:
adjusting scheduling of responses from the server to clients based at least in part on network-level information captured by said kernel-level module for said network connection.

30. The method of claim 19 wherein said kernel-level module is operable to monitor a plurality of concurrent network connections to said server to compile said desired information for said network transactions conducted through said plurality of concurrent network connections.

31. The method of claim 19 wherein said network transactions comprise HTTP transactions.

32. A system for compiling desired information for network transactions comprising:
a processor-based device communicatively coupled to a client-server communication network and arranged on the server-side of said client-server network; and
said processor-based device comprising a kernel-level module for monitoring network-level information for a server, relating said network-level information to corresponding network transactions conducted with the server, and compiling desired information for said corresponding network transactions, wherein said network transactions each comprise a request to the server and a response from the server.

33. The system of claim 32 wherein said processor-based device is said server.

34. The system of claim 32 wherein said network-level information comprises network packets for said network transactions.

35. The system of claim 32 wherein said processor-based device has a TCP connection with said client-server communication network, and wherein said kernel-level module is operable to monitor said TCP connection to compile said desired information from incoming and outgoing network packets for a network transaction conducted via said TCP connection.

36. The system of claim 32 wherein said desired information comprises a web transaction log.

37. The system of claim 32 wherein said network transactions comprise a client access of a web page on said server.

38. The system of claim 37 wherein said desired information comprises information from which said client access of a web page can be reconstructed.

39. The system of claim 32 wherein said processor-based device further comprises user-level space, and wherein said kernel-level module is operable to communicate said desired information to said user-level space.

40. The system of claim 39 further comprising:
means in said user-level space for using said desired information to reconstruct a client access of said server.

41. The system of claim 40 wherein said client access of said server comprises a client access of a web page.

42. The system of claim 32 further comprising:
at least an IP module and a TCP module in the kernel-level of said processor-based device to form a TCP/IP stack.

43. The system of claim 42 wherein said kernel-level module for monitoring network-level information for a server and compiling desired information for network transactions with the server is arranged communicatively between said IP module and TCP module.

44. The system of claim 32 wherein said network transactions comprise HTTP transactions.

45. A method comprising:
capturing, in a kernel-level module of a processor-based device arranged on a server-side of a client-server communication network, network packets of transactions between at least one client and said server, wherein said transactions each comprise a request and a response;
determining from said network packets desired information about said transactions; and
organizing said desired information by respective transaction to which said desired information relates.

46. The method of claim 45 wherein a first transaction comprises a plurality of packets, and wherein said desired information about said first transaction is determined from said plurality of packets.

47. The method of claim 46 further comprising:
correlating said desired information determined from the plurality of packets to the first transaction.

48. The method of claim 47 wherein a second transaction comprises another plurality of packets, and wherein said desired information about said second transaction is determined from said another plurality of packets.

49. The method of claim 48 further comprising:
correlating said desired information determined from the another plurality of packets to the second transaction.

50. The method of claim 45 wherein said desired information comprises performance information for a respective transaction.

* * * * *